United States Patent [19]
Claassen et al.

[11] Patent Number: 5,669,952
[45] Date of Patent: Sep. 23, 1997

[54] PRESSURE FORMING OF GLASS SHEETS

[75] Inventors: George R. Claassen, New Kensington; Irvin A. Wilson, Apollo; David B. Rayburn, Vandergrift; John L. McLaughlin, Apollo; Rudolph A. Karlo, Creighton; Jeffrey L. Marietti, Tarentum, all of Pa.

[73] Assignee: PPG Industries, Inc., Pittsburgh, Pa.

[21] Appl. No.: 323,480

[22] Filed: Oct. 14, 1994

[51] Int. Cl.$^6$ ............................................. C03B 23/02
[52] U.S. Cl. ............................... 65/106; 65/289; 65/287
[58] Field of Search ................................. 65/107, 106, 104, 65/102, 287, 290, 291, 286, 289

[56] References Cited

U.S. PATENT DOCUMENTS

| | | | |
|---|---|---|---|
| 3,332,762 | 7/1967 | McMaster et al. | 65/25 |
| 3,453,161 | 7/1969 | Golightly | 156/106 |
| 3,526,489 | 9/1970 | McPhail | 65/25 |
| 4,265,650 | 5/1981 | Reese et al. | 65/104 |
| 4,290,796 | 9/1981 | Reese et al. | 65/287 |
| 4,529,433 | 7/1985 | Bennett et al. | 65/106 |
| 4,597,789 | 7/1986 | Reese | 65/106 |
| 4,778,507 | 10/1988 | Aruga et al. | 65/106 |
| 4,802,903 | 2/1989 | Kuster et al. | 65/106 |
| 4,804,397 | 2/1989 | Stas et al. | 65/107 |
| 4,842,634 | 6/1989 | Vanaschen et al. | 65/106 |
| 4,859,225 | 8/1989 | Kuster et al. | 65/104 |
| 4,894,080 | 1/1990 | Reese et al. | 65/106 |
| 4,921,520 | 5/1990 | Carlomagno | 65/111 |
| 5,053,069 | 10/1991 | Vanaschen et al. | 65/106 |
| 5,066,320 | 11/1991 | Lehto et al. | 65/106 |
| 5,079,931 | 1/1992 | Lehto et al. | 65/288 |
| 5,250,099 | 10/1993 | Kubo et al. | 65/102 |
| 5,292,355 | 3/1994 | Nikander | 65/107 |
| 5,383,947 | 1/1995 | Montonen | 65/25.4 |

FOREIGN PATENT DOCUMENTS

| | | |
|---|---|---|
| 0290346 | 11/1988 | European Pat. Off. . |
| 0361263 | 4/1990 | European Pat. Off. . |
| 0 571 824 | 12/1993 | European Pat. Off. . |
| 0571824 | 12/1993 | European Pat. Off. . |
| 0 592 862 | 4/1994 | European Pat. Off. . |
| 0613864 | 9/1994 | European Pat. Off. . |
| 43 37 559 | 3/1995 | Germany . |
| WO93/01140 | 1/1993 | WIPO . |
| WO93/06052 | 4/1993 | WIPO . |

*Primary Examiner*—Donald E. Czaja
*Assistant Examiner*—Calvin Padgett
*Attorney, Agent, or Firm*—Andrew C. Siminerio

[57] ABSTRACT

The present invention discloses a method for shaping glass sheets to deeply sagged configurations using a lower outline mold and an upper shaping mold while minimizing marking of the sheets by shaping molds. The outline mold includes a support rail which generally corresponding to the desired curvature of a peripheral portion of the sheets to be shaped and supports the glass sheets as they are heated and sagged by gravity to a preliminary shape. The outline mold and the upper mold are then moved relative to each other to position the molds either in close proximity to each other or to press the upper mold against the glass sheets. Pressurized gas is then directed from the mold to at least the unsupported central portions of the preliminarily shaped sheets, to urge these unsupported portions downward and shape the sheets to a desired configuration.

49 Claims, 3 Drawing Sheets

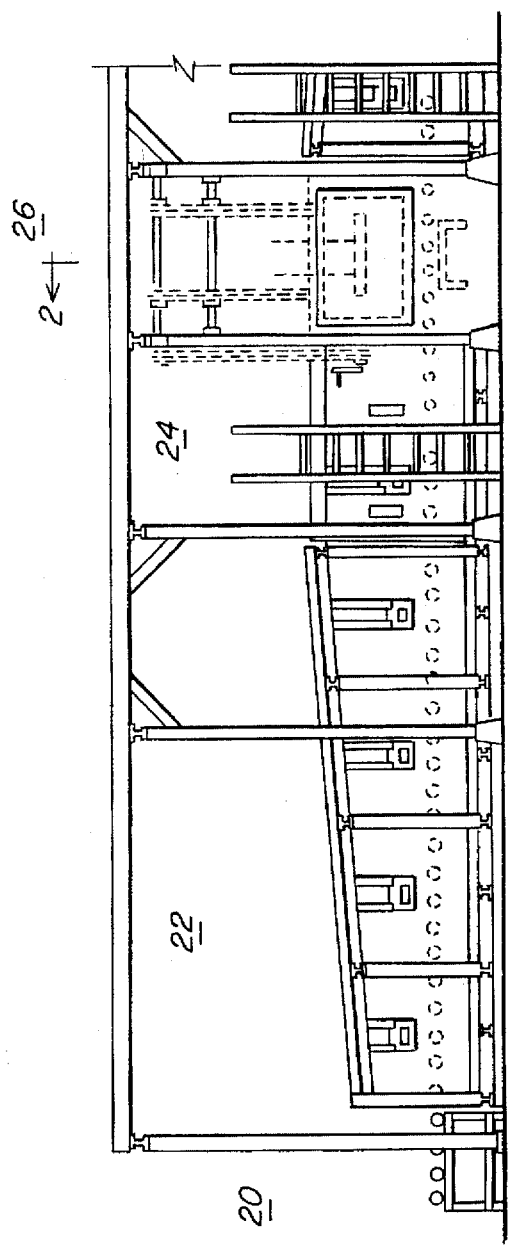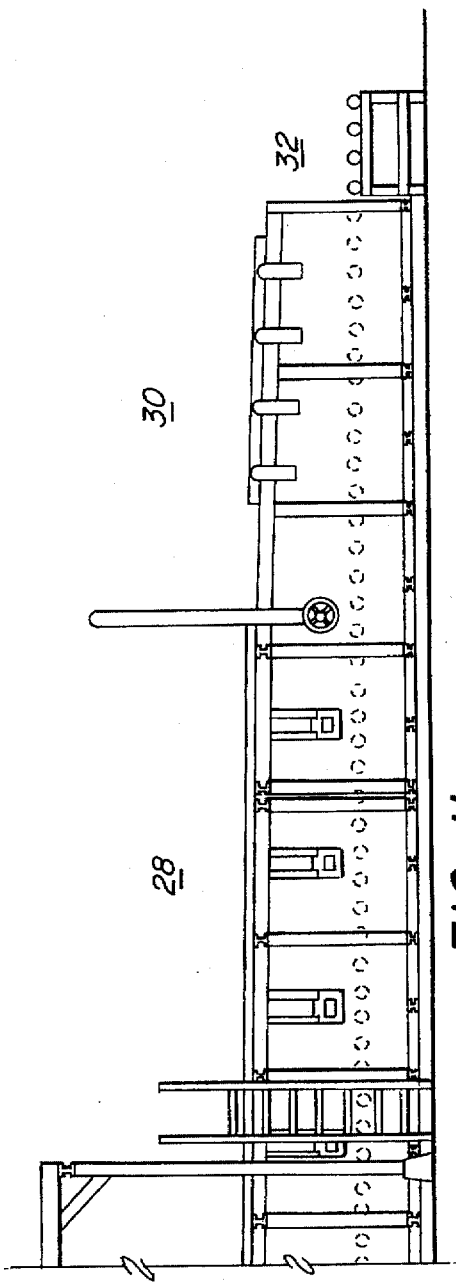

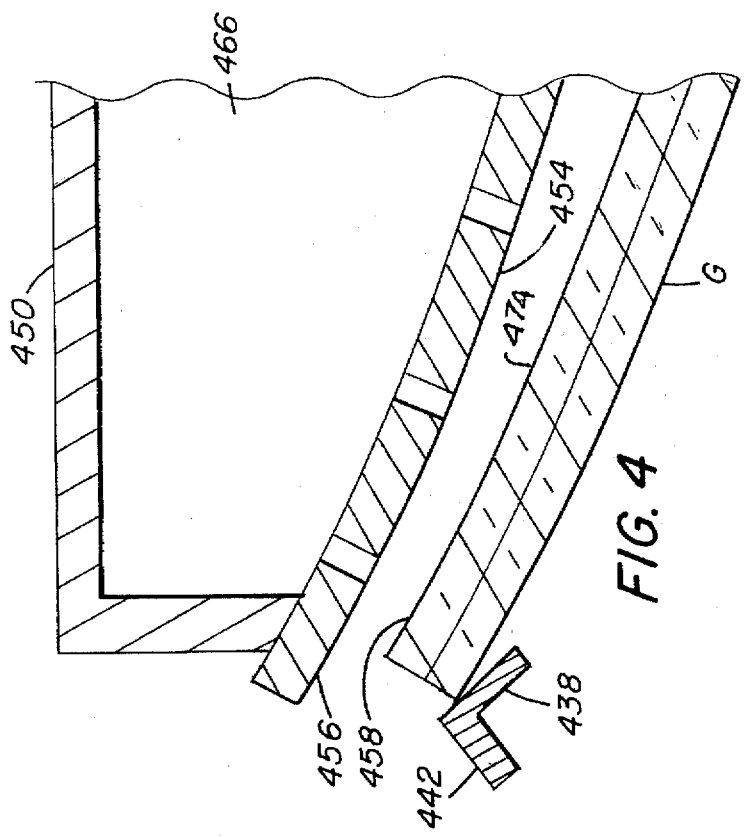
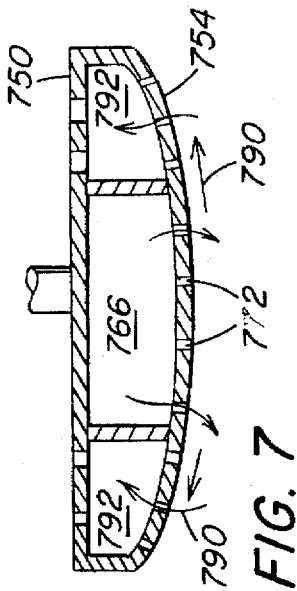
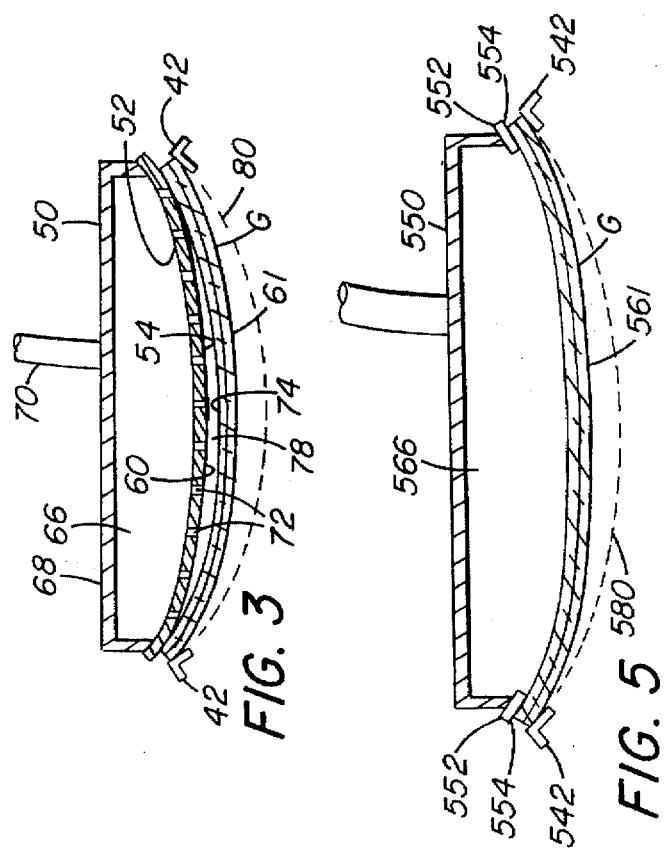
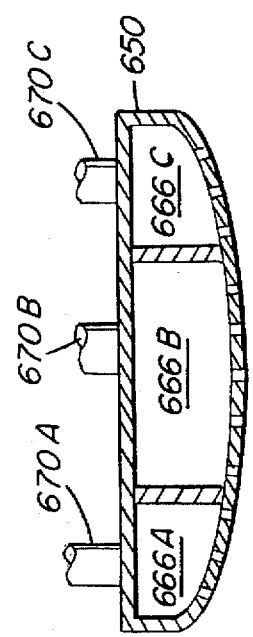

PRESSURE FORMING OF GLASS SHEETS

BACKGROUND OF THE INVENTION

The present invention relates to shaping heat softened glass sheets and in particular to shaping pairs of glass sheets to a deeply curved configuration by a combination of preliminary gravity sag bending on an outline mold and final bending utilizing downwardly directed air pressure.

One common technique for shaping a glass sheet is to support the sheet on an outline bending mold having a shaping rail with an upper surface having elevational contours corresponding to the final desired shape of the glass sheet. The glass sheet is heated to its heat softening temperature and sagged by gravity to assume the desired configuration. This technique is particularly well-suited for simultaneously shaping two sheets of glass, or doublets, that will be used as the inner and outer plies of conventional laminated glass, for example, a windshield.

As glass sheet configurations become more complex and include deeper bend sections, the shaping rails may be segmented and made to pivot from an open, rigid sheet supporting position to a closed, heat-softened glass sheet supporting position. In the closed position, the shaping rails assume the desired elevational contours of the glass sheet to be shaped about its periphery.

To supplement the shaping capabilities of a gravity sag bending operation, partial molds as disclosed in U.S. Pat. No. 4,804,397 to Stas et al., or full surface molds as disclosed in U.S. Pat. Nos. 4,265,650 and 4,894,080 to Reese et al. and 4,778,507 to Aruga et al., may be used. Other techniques, such as that disclosed in U.S. Pat. No. 5,066,320 to Lehto et al. directs high temperature air from a mold surface at selected portions of preliminarily shaped glass sheets to preferentially heat and assist in forming additional sharp bends in these selected portions without contacting the glass surface with the mold, may also be used to supplement the bending operation.

It has been found that in shaping glass to deep sag configurations, and in particular configurations having a maximum sag measured along the centerline of the shaped glass sheet of 15 mm and greater, it is difficult to achieve the deep sag using only gravity bending techniques or by preliminarily shaping the sheets by gravity bending and subsequently contacting the sheets with a bending molding having the final desired configuration without marking the glass or otherwise effecting its optical properties.

It would be advantageous to provide a glass sheet bending operation and in particularly a glass doublet bending operation wherein the glass sheets may be preliminary shaped on an outline bending mold and then finally shaped to a deeply sagged configuration while minimizing any optical distortion in the glass sheets.

SUMMARY OF THE INVENTION

The present invention discloses a method and apparatus for shaping glass sheets to deeply sagged configurations using a lower outline mold and an upper shaping mold, while minimizing marking of the sheets by shaping molds. The outline mold, which has a sheet engaging surface that generally corresponds a desired curvature of a peripheral portion of the sheets to be shaped, supports the glass sheets as they are heated and sagged by gravity to a preliminary shape. The ring mold and the upper mold are then moved relative to each other to position the upper mold at least in close proximity to the peripheral portion of the preliminarily shaped sheets. Pressurized gas is then directed from the mold to at least the unsupported central portions of the preliminarily shaped sheets, to urge these unsupported portions downward and shape the sheets to a desired configuration. The pressurized gas is preferably at a generally uniform temperature that will not appreciably effect the temperature of the sheets during the shaping operation. In one particular embodiment of the invention, the upper mold has a sheet shaping surface which at least corresponds to the desired curvature of the peripheral portion of the preliminarily shaped sheets and the upper mold is moved to press the peripheral portion of the sheet against the outline mold.

BRIEF DESCRIPTION OF THE DRAWINGS

FIG. 1 comprising FIGS. 1a and 1b is a longitudinal side view of a glass sheet bending lehr arrangement in accordance with the present invention. FIG. 1a shows the upstream section and FIG. 1b shows the downstream section.

FIG. 3 is a cross-sectional view of the upper and lower molds when positioned at their pressure forming positions, with portions removed for clarity.

FIG. 4 is a cross-sectional view similar to that in FIG. 3 showing an alternate peripheral seal arrangement.

FIG. 5 is a cross-sectional view of the upper and lower mold for an alternate embodiment of the invention, with portions removed for clarity.

FIGS. 6 and 7 are cross-sectional views of alternate designs of the upper mold used in the present invention.

DETAILED DESCRIPTION OF THE INVENTION

Figure 2:
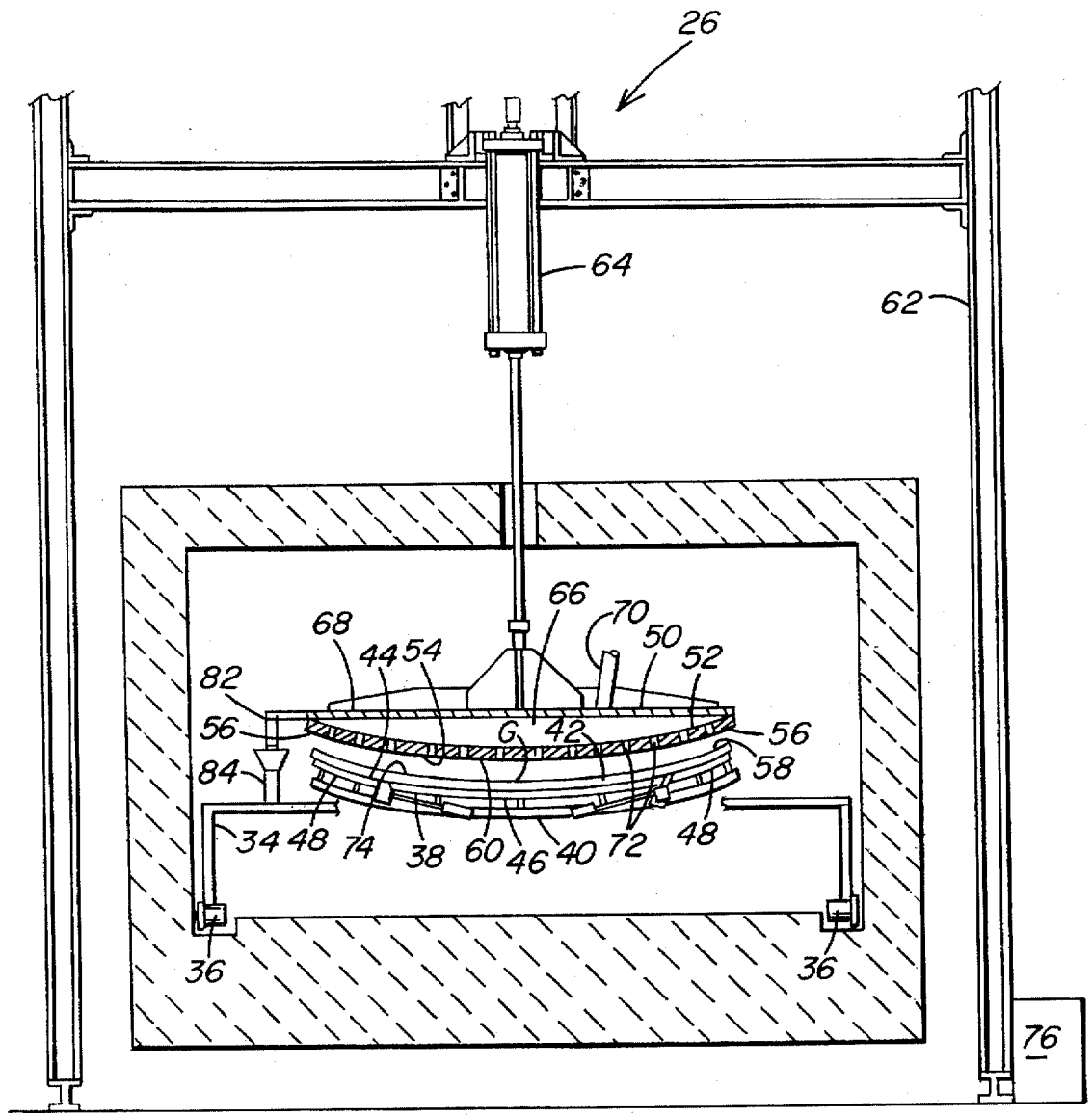
FIG. 2 is a cross-sectional view taken along line 2—2 of FIG. 1 showing a transverse elevation of the press bending station of the lehr arrangement shown in FIG. 1, which incorporates the novel features of present invention and includes an outline mold and an upper pressure forming mold in spaced apart relation, with portions removed for clarity.

The present invention utilizes pressurized gas to shape heat softened glass sheets, and in particular to simultaneously shape doublets for a windshield, but it is understood that the invention as discussed herein may be used to shape a single sheet or any number of sheets of any heat softenable sheet material, where it is desired that the sheet be precisely and accurately shaped to a deeply sagged configuration while marking of the sheets due to shaping is minimized.

FIGS. 1a and 1b depict a heating, shaping and annealing lehr for shaping glass sheets according to the present invention, although other heating and annealing arrangement as are well known to those skilled in the art may be used. The lehr begins at the loading zone 20 and includes a heating zone 22 of tunnel-type configuration, a gravity bending zone 24, an enclosed press bending or shaping station 26, a controlled temperature zone 28, and a cooling station 30, all generally aligned in end-to-end relation along the lehr as shown in FIG. 1. An unloading zone 32 is beyond the cooling zone 30.

Referring to FIG. 2, a plurality of mold support carriages 34 (one only shown in FIG. 2) of a type well known in the art, are conveyed through the lehr in any convenient manner, for example by a plurality of rolls 36 in manner as disclosed in U.S. Pat. No. 4,894,080 to Reese et al. A ring or outline mold 38 and support frame 40 are mounted on each carriage 34. The mold 38 includes a rail member 42 having a support surface 44 that generally conforms in elevation and outline to the final longitudinal and transverse shape desired for the glass sheets G to be bent. Rail member 42 may be a bar member that supports the glass sheets G slightly inboard of the glass sheets' periphery, or it may be an "L" or "T" shaped member as shown in FIG. 2 and support the glass sheets G along the peripheral edge of the lower sheet, or slightly inboard of the glass sheet edge. If desired, the mold 38 may be an articulating shaping mold as shown in FIG. 2, having a stationary central portion 46 and a pair of opposed pivoting end mold wing section 48, as disclosed in U.S. Pat. No. 4,597,789 to Reese.

The shaping station 26 also includes an upper mold 50 having an apertured lower plate 52 with a downwardly facing shaping surface 54. If desired, surface 54 may be provided with a flexible fabric material cover (not shown) that will not mark a hot glass sheet surface when contacted by the material, e.g. fiber glass cloth. Surface 54 has a configuration wherein at least its peripheral area 56 has a shape that generally corresponds to the desired shape of a peripheral portion 58 of the sheets G. In the particular embodiment of the invention shown in FIGS. 2 and 3, the central portions 60 of surface 54 within the peripheral area 56 have a curved configuration with sag dimensions which is less than corresponding unsupported central portions 61 (shown only in FIG. 3) of the preliminarily shaped glass sheets G which are supported on member 42 and formed by gravity bending. It should be appreciated that surface 54 may have a different surface configuration, as well will be discussed later in more detail. Mold 50 is supported within station 26 from frame 62 and is vertically reciprocated by cylinder 64, or any other reciprocating means as are well known in the art, to move the mold 50 at least into close proximity with the supported glass sheets G and, if required, press the mold 50 against the sheets G, as will be discussed later in more detail.

Mold 50 is designed to direct a pressurized gas from its surface 54 towards the upper surface of the supported glass sheets G. In the particular embodiment of the invention shown in FIGS. 2 and 3, mold 50 includes an internal plenum 66 formed between lower plate 52 and an upper plate 68. Supply line 70 supplies pressurized gas to plenum 66 which in turn passes through apertures 72 in lower plate 52 to provide a downwardly directed force on the upper major surface 74 of the preliminarily shaped, heat softened glass sheets G as the mold 50 is moved into close proximity to the sheets by cylinder 64, and further shape the glass sheets G while the sheets are supported on outline mold 38. Controller 76 (shown only in FIG. 2) controls the gas pressure and the time during the shaping operation at which the gas flow is initiated and terminated. Gas pressure may be varied during the shaping operation and the gas flow may be initiated and terminated at various times in the shaping operation, as will be discussed later in more detail.

In the particular embodiment of the invention illustrated in FIGS. 2 and 3, surface 54 of mold 50 extends at least to the peripheral edge of the glass sheets G to contact the peripheral portion 58 of the glass sheets G with area 56 of the mold 50 and press the sheet against rail member 42 to shape the sheets and form a seal about the periphery of the glass sheets G. As a result, the periphery of the glass sheets G is pressed to a desired shape while the area 78 (shown only in FIG. 3) formed between the central portions of the preliminarily shaped glass sheets G and the mold 50 is sealed so that pressurized gas blown into this area 78 will further shape the unsupported portions 61 of the glass sheets G to the desired sheet configuration as indicated by numeral 80 in FIG. 3. In this manner, the physical contact between the upper surface of the glass sheet G and mold surface 54 is minimized while providing a non-contacting bending force to the central portions of the glass, Furthermore, the use of pressurized gas provides a generally uniform pressing force on the glass sheets G as compared to the concentrated forces experienced by the glass sheets when a mold surface is used to contact and press the glass sheets to shape.

It should be appreciated that although the embodiment discussed above attempts to seal the periphery of the glass sheets G against the upper mold 50, it is expected that there will be some leakage at the seal.

CYCLE OF OPERATION

A pair of glass sheets of curved outline and with a suitable parting medium therebetween is positioned in a substantially horizontal orientation on outline mold 38 of the mold supporting carriage 34 at the loading zone 20. The carriage 34 is positioned on the rolls 36 and conveyed through the heating zone 22 of the lehr where heating elements are arranged to provide a desired heating pattern, both longitudinally and/or transversely along the path of travel through the lehr. By the time the mold 38 arrives at the end of the gravity bend station 24 (which is preferably maintained at an ambient temperature range of about 1050° F. to 1200° F. [566° C. to 649° C.]), the glass sheets G have been heated to their deformation temperature (generally between about 1070° F. and 1150° F. [577° C. to 621° C.]) and have sagged by gravity to a preliminary configuration which is less than the desired sheet configuration. In addition, end sections 48 of mold 38 rotate upward to further shape the glass sheets G. It should be appreciated that if the glass sheet shaped in accordance with the present invention will be tempered after shaping rather than annealed as discussed above, the glass temperature during the preliminary gravity bending of the sheet may be as high as 1270° F. (688° C.).

After the preliminary gravity bending of the glass sheets G, carriage 34 continues into the enclosed shaping station 26 to a position below the upper mold 50. During passage of the outline mold 38 from the loading zone 20 to the shaping station 26, it may lose its alignment with respect to the longitudinal reference line of the lehr. To ensure that the mold 50 and glass sheets G are properly vertically aligned during the shaping operation, the upper mold 50 is provided with a plurality of alignment pins 82 (only one shown in FIG. 2) which are received by receivers 84 on carriage 34 as the mold 50 moves to a position at least in close proximity to the outline mold 38. As an alternative, the carriage 34 may be physically realigned relative to the mold 50, e.g. as disclosed in U.S. Pat. No. 4,290,796 to Reese et al.

After the preliminarily shaped glass sheets G are positioned below mold 50, cylinder 64 begins to move mold 50 downward towards the glass sheet G. If desired, controller 76 may initiate the flow of pressurized gas from supply line 70 into plenum 66 and through apertures 72 of lower plate 52 as the mold 50 approaches the sheets G. In one particular embodiment of the invention, the pressurized gas is air and both the air and mold 50 are heated so that they are effectively neutral to the glass, i.e. they have a minimal heating or cooling effect on the glass sheets G. More particularly, the glass sheets' temperature should not be changed during the shaping operation by more than 100° F. (56° C.), and preferably by more than 50° F. (28° C.). In a preferred embodiment of the invention, the temperature of the sheets is not increased. The air may be preheated externally from the lehr or may be drawn from the ambient air within the lehr. Although not limiting in the present invention, the air is delivered to the glass sheets G preferably at a temperature between 700° F. to 1200° F. (371° C. to 649° C.) and the mold 50 is preferably at a temperature between 1000° F. to 1200° F. (538° C. to 649° C.). It should be appreciated that the longer the pressurized air is directed toward the supported sheets G and/or the closer the mold 50 is to the sheets G, the greater the potential for the effecting glass sheets' temperature.

As the mold 50 approaches the heat softened glass sheets G, the force from the pressurized air urges the preliminarily shaped glass sheets downward and begins to further increase the sag in the glass. The mold 50 continues to moves downward until peripheral area 56 contacts the corresponding peripheral portion 58 of the sheets G. Since the curvature of the central portions 60 of mold 50 in this particular embodiment of the invention is generally less than the sagged shape of corresponding portions 61 of the preliminary shaped glass sheets G, the only contact between the glass sheets and the mold 50 is about the upper glass sheets' periphery. As discussed earlier, this forms a seal which inhibits escape of pressurized air from area 78 between the glass sheets G and the mold 50. Depending on the amount of pressure and hold time, i.e. the time that the air pressure is maintained while the mold 50 remains in peripheral contact with the glass sheets G and maintains the seal, the greater the glass sheets G will be forced downward to further shape the glass sheets and provide the desired deep sag configuration. In this manner, increased sag curvature is achievable in the unsupported central portions 61 of the glass sheets G through minimal contact between the glass and the mold surface while pressing the peripheral contours of the glass sheet to ensure a correct configuration. After the shaping is completed, controller 76 terminates the pressurized air flow and the upper mold 50 and outline mold 38 separate, leaving the fully shaped glass sheets G on the mold 38. Carriage 34 then continues through the controlled temperature zone 28 of the lehr, where the glass is controllably cooled, and then through the cooling station 30 and to the unloading zone 32. If required, the It should be appreciated that although the particular embodiment of the invention shown in FIG. 2 and discussed above moves the mold 50 downward toward the glass sheets G supported on mold 38, as an alternative, carriage 34 may be moved upward to lift the mold 38 and move sheets G toward mold 50.

During preliminary testing of this novel pressure shaping arrangement, the controller 76 initiated the flow of pressurized air just before the peripheral area 56 of mold 50 contacted the peripheral portion 58 of sheets G and continued the air flow for a period of 3–4 seconds. Air pressure in the plenum 66, which was held constant during each trial, was varied from approximately 0.30 to 0.78 psi (21.1 to 54.8 g/cm²) which resulted in a relatively uniform pressure along the glass surface 74 ranging from approximately 0.29 to 0.59 psi (20.4 to 41.4 g/cm²). In a first series of trials which utilized a mold 52 having a 10 mm centerline sag to shape a preliminarily shaped glass doublet having an 11 mm centerline sag, an additional sag of about 5.7 to 9.8 mm was produced in the glass sheets. In another trial where the preliminarily shaped glass doublet had a 13 mm centerline sag, an additional sag of about 6.7 to 14.2 mm was produced in the glass.

As an alternative to shaping the sheets by contacting the peripheral edge of the sheets to form a "hard seal" as discussed earlier and shown in FIGS. 2 and 3, it has been found that acceptable shaping may be achieved without contacting the glass sheet surface. Such a shaping arrangement where the peripheral area 56 comes close to but does not contact the glass sheet surface is hereinafter referred to as a "soft seal" arrangement. More particularly, referring to FIG. 4, peripheral area 456 of mold 450 is spaced apart from peripheral portion 458 of the glass sheets so that outward gas flow about the periphery of the sheets is at least partially restricted. It should be appreciated that if the shaping operation does not require the peripheral area of the mold 450 to contact the glass sheets G and press the glass against rail member 442, the mold 450 may be sized to be smaller than the peripheral outline defined by mold 438.

In a series of trials using an upper mold 450 having a 10 mm centerline sag to shape glass doublets supported on an outline mold 438 having a preliminarily shaped centerline sag of 11 mm, where the gap between the peripheral area 456 of surface 454 of mold 450 and the periphery of the glass was approximately 0.10 inches (2.54 mm), air pressure in the plenum 466, which was held constant during each of the trials, was varied from approximately 0.21 to 0.55 psi (14.8 to 38.7 g/cm²) which resulted in a pressure along the glass surface of approximately 0.14 to 0.29 psi (9.8 to 20.4 g/cm²) and an additional sag in the glass of about 2.7 to 5.9 mm. When the preliminarily shaped centerline sag of the sheets was increased to 13 mm and air pressure in the plenum 466 was varied from approximately 0.19 to 0.52 psi (13.4 to 36.6 g/cm²), which resulted in a pressure along the glass surface of approximately 0.13 to 0.22 psi (9.1 to 15.5 g/cm²), the additional sag in the glass ranged from 4.1 to 7.3 mm. Additional trials were conducted using a gap of approximately 0.19 inches (4.83 mm). For a preliminarily shaped sheets having centerline sag of 11 mm, where the air pressure in the plenum 466 was varied between trials from approximately 0.16 to 0.30 psi (11.2 to 21.1 g/cm²) which resulted in a pressure along the glass surface of approximately 0.04 to 0.14 psi (2.8 to 9.8 g/cm²), the additional sag in the glass ranged from about 1.3 to 2.5 mm. When the preliminarily shaped sheet centerline sag was increased to 13 mm and air pressure in the plenum 466 was varied from approximately 0.14 to 0.29 psi (9.8 to 20.1 g/cm²), which resulted in a pressure along the glass surface of approximately 0.03 to 0.11 psi (2.1 to 7.7 g/cm²), the additional sag in the glass ranged from about 1.2 to 3.6 mm.

The shaping pressure along the glass surface during the hard seal trials was higher than that in the soft seal trials, and in turn resulted in greater additional sag in the sheets as compared to the soft seal trials. It is believed that if the pressure along the sheet surface 474 (shown in FIG. 4) in the soft seal operation was increased to levels comparable to those in the hard seal trials, the additional sag resulting from a soft seal operation would be comparable to those in the hard seal operation. It should be noted that to provide this higher pressure in a soft seal operation, it will require a greater volume of air to produce these higher surface pressures.

It should be appreciated that the various operating parameters, and in particular gas pressure, gap size, and the time in the shaping operation at which the flow of pressurized gas is initiated and terminated, may be varied to control the additional sag imparted to the preliminarily shaped glass sheets G. For example, it was observed that as the gap distance increases, the required pressure and/or length of hold time increases in order to get the same effect on the preliminary shaped glass sheet G. In addition, it was found that initial pressure forming of the glass sheets G may be effected before the mold 50 is in its final shaping position by supplying the pressurized gas to the mold 50 as it approaches the glass sheets G. It should also be noted that the amount of sag in the preliminarily shaped sheets effects the shaping operation. More particularly, it was observed that when comparing the additional sag formed by the pressure shaping operation of the present invention for both the hard seal and soft seal approach, when the centerline sag of the preliminarily shaped sheets is greater, the additional sag imparted to the glass sheets under the same pressure shaping conditions is greater.

The shaping operation discussed above may combine both the hard seal and soft approach. More particularly, the mold 50 may be lowered into close proximity to the preliminarily shaped glass sheets, forming a soft seal about the sheet periphery, with the pressurized gas imparting additional sag in the glass sheets G. This may be followed by a final pressing step wherein the mold 50 is pressed against the periphery of the sheets G to positively shape peripheral portion 58 of the sheets G between peripheral area 56 of mold 50 and rail 42. It should be further appreciated that this final pressing step may be performed either with the pressurized gas continuing to be supplied along surface 74 of the sheets G to further shape the glass sheets or with the gas flow terminated to eliminate the shaping pressure.

Although in the embodiment described in FIG. 1, the mold has a shaped surface with sag dimensions less than corresponding portions of the preliminarily shaped glass sheets G, other mold configurations may be used in a manner as taught herein to further shape preliminarily shaped glass sheets. For example, referring to FIG. 5, upper mold 550 includes a peripheral ring 552 that defines a downwardly shaping facing surface 554 which generally corresponds to the desired curvature of the peripheral portion of the sheets supported on rail 542. During the shaping operation, as the mold 550 is moved into contact with the peripheral portion of the glass sheet G, cavity 566 of the mold 550 is pressurized to force the unsupported central portions 561 of the preliminary shaped glass sheets G downward to a desired sheet configuration indicated by numeral 580.

In another embodiment of the invention, the shape of mold surface 54 may be configured to generally correspond to the sag of the preliminarily shaped glass sheets G and the gas pressure used to impart 10 additional sag to form the desired configuration. In test trials utilizing this upper mold configuration, it was found that by using a hard seal approach to shape preliminarily shaped doublets with a mold having a centerline sag of 15 mm, an additional sag of over 15 mm could be imparted into the glass using a plenum air pressure of approximately 0.77 psi (54.1 g/cm$^2$) and applying this pressure for 3–4 seconds after forming a hard seal about the glass sheet perimeter. Although the pressure along the sheet surface 74 was not measured, it is believed that it was comparable to the surface pressure measured in the hard seal trials for a 13 mm preliminary sag for a comparable plenum pressure.

The curvature of the mold surface 54 may be increased even further such that the mold sag is greater than corresponding portions of the preliminarily shaped glass sheets G. It should be noted that with this type of mold configuration, it is preferable to wait until the pressurized gas forces the glass sheets G downward to a sag dimension deeper than that of the mold before moving the mold to its final shaping position to minimize marking of the glass by the mold surface. During trials using a mold with a centerline sag of 15 mm, a gap spacing from 0 to 0.19 inches (0 to 4.83 mm) and plenum pressures of up to approximately 0.77 psi (54.1 g/cm$^2$) it was found even with a preliminary sag of 13 mm, the mold 50 came into contact with the upper glass surface. This was the result of the glass sheets being too rigid, i.e. they were not at a high enough temperature to be readily shaped by the gas pressure, the pressure being too low and/or moving the mold into its final shaping position too quickly. It is believed that if the glass temperature was increased, the gas pressure was increased, and/or the speed at which the mold is moved toward the sheets is reduced, the glass sheets may be shaped in the preferred manner discussed above. However, it is noted that a final sag of 27.3 mm was imparted to sheets having a 13 mm preliminary centerline sag using a hard seal approach (i.e. no gap), a plenum pressure of approximately 0.77 psi (54.1 g/cm$^2$), initiating the gas pressure 3 seconds prior to the mold reaching its final shaping position and maintaining the gas pressure for an additional 3 seconds.

Still another embodiment of the invention includes a mold surface 54 having a shape generally corresponding to the desired glass shape. Unlike the arrangement disclosed in U.S. Pat. No. 5,066,320 to Lehto et al., which directs high temperature air at selected portions of the glass sheets to raise the temperature of these portions so that they are more susceptible to forming sharp bends, the present invention does not change the heat profile of the glass in selected areas to effect shaping but rather does all of the shaping by pressure without requiring any additional heat in the shaping operation. If the mold 50 is pressed against the glass sheets G during the shaping operation, since the glass sheets G have already been shaped to their desired curvature, which also corresponds to the shape of mold surface 54, the surface 54 should simultaneously contact large portions, if not all of the glass surface thus distributing any pressing forces over the glass surface and minimizing any distortion to the glass due to shaping. In addition, the pressurized gas flow should be terminated prior to the mold 50 contacting the sheets to prevent undesired additional sag.

Under certain operating conditions, the glass sheets may tend to "spring back" after being shaped by the pressurized gas and mold to a curved configuration with sag less than that imparted in the sheets during the shaping operation. Such operating conditions include, but are not limited to, an operation where the force applied by the pressurized gas is not held long enough to allow the sheets to stabilize and maintain their shape or the sheet temperature is too low to maintain the pressure formed shape. Under such operating conditions, it may be desirable to over-shape the glass sheets, i.e. shape them to a curvature greater than the final desired shape, so that after the upper mold and outline mold are moved apart, the sheets will spring back and conform to the final desired shape. This may be accomplished by using pressurized gas in a manner as disclosed herein to form the sheets to a desired configuration having a sag greater than the final desired shape. In addition, in the particular embodiment of the invention where the shaping surface 54 of the upper mold 50 generally conforms to the final desired shape, the pressurized gas may be used to over-shape the sheets so that when the gas flow is terminated, the sheets will to spring back and contact the shaping surface 54. Furthermore, the surface 54 of the mold 50 may have a configuration with sag dimensions that exceed the final desired shape so that after shaping, the sheets may spring back to the final desired shape.

As discussed earlier, after the pressure shaping operation is completed, the glass sheets are moved into the controlled temperature zone 28, where the sheets are controllably cooled and annealed. If desired, prior to annealing, the shaped glass sheets may be positioned within a portion of zone 28 that maintains the glass sheets at their heat softening temperature so that the pressure shaped sheets may be further shaped by additional gravity bending.

It should be appreciated that each of the embodiments of the invention discussed above may incorporate a hard seal approach, wherein the periphery of the mold contacts the periphery of the glass to shape the glass between the upper mold and the support rail and contain the pressurized air within the sealed space between the mold face and the glass to shape the glass, or a soft seal approach, where the mold surface 54 remains spaced from the glass surface and the downward force of the air pressure shapes the entire glass sheet, or a combination of the two as discussed above.

Although the preliminary trials discussed above use surface pressures of up to about 0.60 psi (42.2 g/cm$^2$) and a gap spacing of up to 0.19 inches (4.83 mm), it is believed that preliminarily shaped glass sheets may be further shaped in a manner as taught in the present invention using surface pressures up to 2 psi (140.6 g/cm$^2$) but preferably up to 1 psi (70.3 g/cm$^2$) and a peripheral gap of up to 1 inch (25.4 mm) but preferably up to 0.5 inches (12.7 mm). Furthermore, although the trials used hold times of up to 4 seconds, it is believed that the pressure shaping operations as taught herein may incorporate low pressure levels and extended hold times of up to 60 seconds, but preferably up to 8 seconds. In addition, the surface pressures, gap spacing and hold times, as well as the time during the shaping operation at which the pressurized gas flow to the upper mold is initiated and terminated, may be adjusted to produce shaped glass sheets having a centerline sag dimension in excess of 30 mm. It should be appreciated that the particular combination of these variables required to impart the desired additional sag in preliminarily shaped sheets will depend, in part, on the amount of preliminary sag in the glass sheets, the shape of the upper mold's surface and the desired glass sheet shape. Furthermore, the pressure applied to surface 74 of sheets G may be varied during the shaping operation to obtain the desired final shape, e.g. a first pressure may be applied for a first period of time and a second pressure may be applied for a second period of time, or the pressure may be pulsed.

The shaping arrangements and operations discussed above may be modified further to vary the shaping force provided by the pressurized gas from mold 50 along sheet surface 74. More particularly, referring to FIG. 6, mold 650 may include a plurality of plenums 666A, 666B and 666C, each of which is connected to a supply line 670A, 670B and 670C, respectively. The gas pressure in each plenum and the resulting shaping force directed from each plenum along the surface of the preliminarily shaped glass sheets G may be controlled to provide a greater shaping force to those portions of the sheets that required a deeper sag dimension, e.g. in the central area of the glass sheets G. If desired, no pressure may be applied at selected plenums.

As an alternative to incorporating several plenums to vary the pressure along the glass surface, pressure may be varied in a manner as shown in FIG. 7. More particularly, the plenum 766 may be located within the mold 750 so that pressurized gas is directed toward the glass sheets only in those areas which require an additional shaping force to achieve the desire deeply sagged configuration. As the pressurized gas is distributed along the glass surface, it may pass upwardly through the apertures 772 in those portions of the surface 754 that as not supplied by the plenum 766, as shown by arrows 790, into portions 792 of the mold 750 that are not sealed and pressurized. In this manner, those areas of the glass sheet below the plenum 766 are shaped by the force provided by the pressurized gas while the shaping force of the gas along the remaining portions of the glass surface is significantly reduced by providing an escape path for the gas.

The invention described and illustrated herein represents a description of illustrative preferred embodiments thereof. It is understood that various changes may be made without departing from the gist of the invention defined in the claims set to follow.

We claim:

1. A method for shaping heat softenable sheet material, comprising:

supporting at least one sheet to be shaped on an outline mold having a sheet engaging surface generally corresponding to a desired curvature of peripheral portions of said sheet to be shaped, said sheet having an upper major surface and a lower major surface;

heating said sheet to its heat softening temperature such that said peripheral portions of said sheet along said lower major surface of said sheet sag by gravity into contact with said outline mold and generally conform to said sheet engaging surface of said outline mold and unsupported central portions of said sheet within said outline mold sag by gravity to preliminarily shape said sheet;

first moving said outline mold and an upper mold, having a sheet shaping surface which includes peripheral shaping portions that generally correspond to said desired curvature of said peripheral portion of said sheet and a central portion that has a predetermined curvature which is less than a desired curvature of said unsupported central portions of said sheet, relative to each other such that said peripheral shaping portions of said sheet shaping surface of said upper mold are spaced from but in close proximity to said peripheral portions of said sheet;

directing pressurized gas from said upper mold toward said upper major surface of said sheet at least along said unsupported central portions of said sheet to urge said unsupported central portions away from said central portion of said sheet shaping surface of said upper mold and shape said unsupported central portions of sheet to said desired curvature of said unsupported central portions which is greater than said predetermined curvature of said central portion of said sheet shaping surface of said upper mold; and subsequently moving said outline mold and said upper mold relative to each other such that said peripheral shaping portions of said sheet shaping surface of said upper mold are removed from being in close proximity to said peripheral portions of said sheet, wherein said sheet is contacted only by said sheet engaging surface of said outline mold during said heating, first moving, directing and subsequent moving steps.

2. The method as in claim 1 wherein said directing step includes the step of directing said gas toward said sheet during at least a portion of said first moving step.

3. The method as in claim 1 further including the step of varying the pressure applied to said sheet during said directing step.

4. The method as in claim 1 further including the step of maintaining different pressures at different locations along said unsupported portions of sheet during said directing step.

5. The method as in claim 4 further including the step of providing said upper mold with a plurality of plenums and said maintaining step includes the step of supplying gas to each of said plenums at different pressures to maintain different pressures at different locations along said unsupported central portions of said sheet.

6. The method as in claim 1 wherein after said subsequent moving step, further including the step of allowing said sheet to spring back to a final configuration.

7. The method as in claim 1 wherein after said subsequent moving step, further including the steps of maintaining said sheet at its heat softening temperature and further sagging said sheet under gravity to form a final configuration.

8. The method as in claim 1 wherein said first moving step includes the step of spacing said peripheral shaping portions of said sheet shaping surface of said upper mold a maximum of 1 inch from said peripheral portions of said preliminarily shaped sheet.

9. The method as in claim 1 wherein said directing step includes the step of maintaining a pressure along said upper major surface of said sheet of up to 2 psi.

10. The method as in claim 9 further including the step of continuing said directing step for up to 60 seconds.

11. The method as in claim 1 further including the step of terminating said directing step prior to said subsequent moving step.

12. The method as in claim 1 further including the step of terminating said directing step during said subsequent moving step.

13. The method as in claim 1 wherein said peripheral portions of said sheet includes the entire peripheral portion of said sheet.

14. A method for shaping heat softenable sheet material, comprising:

supporting at least one sheet to be shaped on an outline mold having a sheet engaging surface generally corresponding to a desired curvature of peripheral portions of said sheet;

heating said sheet to its heat softening temperature such that said peripheral portions of said sheet sag by gravity into contact with and generally conform to said sheet engaging surface of said outline mold and unsupported central portions of said sheet within said outline mold sag by gravity to preliminarily shape said sheet;

first moving said outline mold and an upper mold, having a sheet shaping surface which includes peripheral shaping portions that generally correspond to said desired curvature of said peripheral portions of said sheet and a central portion that has a predetermined curvature which is less than a desired curvature of said unsupported central portions of said sheet, relative to each other such that said peripheral portions of said sheet are pressed between said peripheral shaping portions of said sheet shaping surface of said upper mold and said sheet engaging surface of said outline mold;

directing pressurized gas from said upper mold against at least said unsupported central portions of said sheet to urge said unsupported central portions away from said central portion of said sheet shaping surface of said upper mold and shape said unsupported central portions of said sheet to said desired curvature of said unsupported central portions which is greater than said predetermined curvature of said central portion of said sheet shaping surface of said upper mold; and subsequently moving said outline mold and said upper mold relative to each other such that said peripheral portions of said sheet are no longer pressed between said peripheral shaping portions of said sheet shaping surface of said upper mold and said sheet engaging surface of said outline mold, wherein said sheet is contacted only by said sheet engaging surface of said outline mold and said peripheral shaping portions of said sheet shaping surface of said upper mold during said heating, first moving, directing and subsequent moving steps.

15. The method as in claim 14 wherein said directing step includes the step of directing said gas toward said sheet during at least a portion of said moving step.

16. The method as in claim 14 further including the step of varying the pressure applied to said sheet during said directing step.

17. The method as in claim 14 further including the step of maintaining different pressures at different locations along said unsupported central portions of said sheet during said directing step.

18. The method as in claim 17 further including the step of providing said upper mold with a plurality of plenums and said maintaining step includes the step of supplying gas to each of said plenums at different pressures to maintain different pressures at different locations along said unsupported central portions of said sheet.

19. The method as in claim 14 wherein after said subsequent moving step, further including the step of allowing said sheet to spring back to a final configuration.

20. The method as in claim 14 wherein after said subsequent moving step, further including the step of maintaining said sheet at its heat softening temperature and further sagging said sheet under gravity to form a final configuration.

21. The method as in claim 14 further including the step of maintaining a pressure along an upper major surface of said sheet of up to 2 psi during at least a portion of said directing step.

22. The method as in claim 21 wherein said directing step continues for up to 60 seconds after completion of said moving step.

23. The method as in claim 14 wherein prior to said first moving step, further including the step of initially moving said outline mold and upper mold relative to each other such that said upper mold is spaced from but in close proximity to said peripheral portion of said sheet, and further wherein at least a portion of said directing step is performed during said initial moving step.

24. The method as in claim 23 further including the step of continuing said directing step for a predetermined period after completion of said subsequent moving step.

25. The method as in claim 23 wherein said initial moving step moves said peripheral shaping portions of said upper mold a distance of no more than 1 inch from said peripheral portions of said sheet.

26. The method as in claim 14 wherein said at least one sheet is a first glass sheet overlaying a second glass sheet and said upper major surface is an upwardly facing surface of said first glass sheet and said lower major surface is a downwardly facing surface of said second glass sheet.

27. The method as in claim 14 wherein said directing step includes the step of directing pressurized gas at a generally uniform temperature.

28. The method as in claim 14 wherein said directing step includes the step of directing pressurized gas at a generally uniform temperature.

29. The method as in claim 14 further including the step of terminating said directing step prior to said subsequent moving step.

30. The method as in claim 14 further including the step of terminating said directing step during said subsequent moving step.

31. The method as in claim 14 wherein said peripheral portions of said sheet includes the entire peripheral portion of said sheet.

32. A method for shaping heat softenable sheet material, comprising:

supporting at least one sheet on an outline mold having a sheet engaging surface generally corresponding to a desired curvature of a peripheral portion of said sheet to be shaped;

heating said sheet to its heat softening temperature such that said sheet sags by gravity and is preliminarily shaped, wherein said peripheral portion of said sheet sags into contact with and generally conforms to said sheet engaging surface of said outline mold;

moving said outline mold and an upper mold having a sheet shaping surface which at least corresponds to said desired curvature of said peripheral portion of said sheet, relative to each other such that said peripheral portion of said sheet is pressed between said upper mold and outline mold;

directing pressurized gas against at least unsupported portions of said sheet within said outline mold during at least a portion of said moving step, wherein said force urges said unsupported portions downward to shape said sheet to a desired configuration;

continuing said directing step after completion of said moving step; and subsequently terminating said directing step and allowing said shaped sheet to spring back such that said unsupported portions of said sheet contact said sheet shaping surface of said upper mold.

33. A method for shaping heat softenable sheet material, comprising:

supporting at least one sheet on an outline mold having a sheet engaging surface generally corresponding to a desired curvature of a peripheral portion of said sheet to be shaped;

heating said sheet to its heat softening temperature such that said sheet sags by gravity and is preliminarily shaped, wherein said peripheral portion of said sheet sags into contact with and generally conforms to said sheet engaging surface of said outline mold;

initially moving said outline mold and an upper mold having a sheet shaping surface which at least corresponds to said desired curvature of said peripheral portion of said sheet relative to each other such that said upper mold is spaced from but in close proximity to said peripheral portion of said sheet;

directing pressurized gas against at least unsupported portions of said sheet within said outline mold during at least a portion of said moving step, wherein said force urges said unsupported portions downward to shape said sheet to a desired configuration;

maintaining said close proximity between said upper mold and said sheet during at least a portion of said directing step; and subsequently moving said outline mold and said upper mold relative to each other such that peripheral portion of said sheet is pressed between said upper mold and outline mold;

continuing said directing step after completion of said moving step; and subsequently terminating said directing step and allowing said shaped sheet to spring back such that said unsupported portions of said sheet contact said sheet shaping surface of said upper mold.

34. A method for shaping heat softenable sheet material, comprising:

supporting at least one sheet to be shaped on an outline mold having a sheet engaging surface generally corresponding to a desired curvature of peripheral portions of said sheet;

heating said sheet to its heat softening temperature such that said peripheral portions of said sheet sag by gravity into contact with and generally conform to said sheet engaging surface of said outline mold and unsupported central portions of said sheet within said outline mold sag by gravity to preliminarily shape said sheet;

first moving said outline mold and an upper shaping member, having only a peripheral shaping surface that generally corresponds to said desired curvature of said peripheral portions of said sheet, relative to each other such that said peripheral shaping surface of said upper shaping member is spaced from but in close proximity to said peripheral portions of said sheet;

directing pressurized gas from said upper shaping member toward at least said unsupported central portions of said sheet to urge said unsupported central portions away from said upper shaping member and shape said sheet to a desired configuration; and subsequently moving said outline mold and said upper mold relative to each other such that said peripheral shaping surface of said upper mold is removed from being in close proximity to said peripheral portions of said sheet, wherein said sheet is contacted only by said sheet engaging surface of said outline mold during said heating, first moving, directing and subsequent moving steps.

35. The method as in claim 34 wherein said directing step includes the step of directing pressurized gas at a generally uniform temperature.

36. The method as in claim 34 wherein said peripheral portions of said sheet includes the entire peripheral portion of said sheet.

37. A method for shaping heat softenable sheet material, comprising:

supporting at least one sheet to be shaped on an outline mold having a sheet engaging surface generally corresponding to a desired curvature of peripheral portions of said sheet;

heating said sheet to its heat softening temperature such that said peripheral portions of said sheet sag by gravity into contact with and generally conform to said sheet engaging surface of said outline mold and unsupported central portions of said sheet within said outline mold sag by gravity to preliminarily shape said sheet;

first moving said outline mold and an upper shaping member, having only a peripheral shaping surface that generally corresponds to said desired curvature of said peripheral portions of said sheet, relative to each other such that said peripheral portions of said sheet are pressed between peripheral shaping surface of said upper shaping member and said sheet engaging surface of said outline mold;

directing pressurized gas from said upper shaping member toward at least said unsupported central portions of said sheet to urge said unsupported central portions away from said upper shaping member and shape said sheet to a desired configuration; and subsequently moving said outline mold and said upper shaping member relative to each other such that said peripheral portions of said sheet are no longer pressed between peripheral shaping surface of said upper shaping member and said sheet engaging surface of said outline mold, wherein said sheet is contacted only by said sheet engaging surface of said outline mold and said peripheral shaping surface of said upper shaping member during said heating, first moving, directing and subsequent moving steps.

38. The method as in claim 37 wherein said peripheral portions of said sheet includes the entire peripheral portion of said sheet.

39. The method as in claim 37 wherein said directing step includes the step of directing pressurized gas at a generally uniform temperature.

40. A method for shaping glass sheets, comprising:

supporting a pair of overlaying upper and lower glass sheets on an outline mold having a sheet engaging surface generally corresponding to a desired curvature of peripheral portions of said upper and lower sheets;

heating said sheets to their heat softening temperature such that said peripheral portions of said sheets sag by gravity with peripheral portions of said lower sheet contacting and generally conforming to said sheet engaging surface of said outline mold and unsupported central portions of said sheets within said outline mold sag by gravity to preliminarily shape said sheets;

first moving said outline mold and an upper mold, having a sheet shaping surface which includes peripheral shaping portions that generally correspond to said desired curvature of said peripheral portions of said sheets and a central portion that has a predetermined curvature which is less than a desired curvature of said unsupported central portions of said sheets, relative to each other such that said peripheral shaping portions of said sheet shaping surface of said upper mold are spaced from but in close proximity to said peripheral portions of said sheets;

directing pressurized gas at a generally uniform temperature from said upper mold toward said unsupported central portions of said sheets to urge said unsupported central portions away from said central portion of said sheet shaping surface of said upper mold and shape said pair of sheets to a desired configuration, wherein said unsupported central portions are shaped to said desired curvature of said unsupported central portions which is greater than said predetermined curvature of said central portion of said sheet shaping surface of said upper mold; and subsequently moving said outline mold and said upper mold relative to each other such that said peripheral shaping portions of said sheet shaping surface of said upper mold are removed from being in close proximity to said peripheral portions of said sheets, wherein said sheets are contacted only by said sheet engaging surface of said outline mold during said heating, first moving, directing and subsequent moving steps.

41. The method as in claim 40 further including the step of terminating said directing step prior to said subsequent moving step.

42. The method as in claim 40 further including the step of terminating said directing step during said subsequent moving step.

43. The method as in claim 40 wherein said peripheral portions of said sheets includes the entire peripheral portions of said sheets.

44. A method for shaping glass sheets, comprising:

supporting a pair of overlaying upper and lower glass sheets on an outline mold having a sheet engaging surface generally corresponding to a desired curvature of peripheral portions of said upper and lower sheets;

heating said sheets to their heat softening temperature such that said peripheral portions of said sheets sag by gravity with peripheral portions of said lower sheet contacting and generally conforming to said sheet engaging surface of said outline mold and unsupported central portions of said sheets within said outline mold sag by gravity to preliminarily shape said sheets;

first moving said outline mold and an upper mold, having a sheet shaping surface which includes peripheral shaping portions that generally correspond to said desired curvature of said peripheral portions of said sheets and a central portion that has a predetermined curvature which is less than a desired curvature of said unsupported central portions of said sheets, relative to each other such that said peripheral portions of said sheets are pressed between said peripheral shaping portions of said sheet shaping surface of said upper mold and sheet engaging surface of said outline mold;

directing pressurized gas at a generally uniform temperature from said upper mold toward said unsupported central portions of said sheets to urge said unsupported central portions away from said central portion of said sheet shaping surface of said upper mold and shape said pair of sheets to a desired configuration, wherein said unsupported central portions are shaped to said desired curvature of said unsupported central portions which is greater than said predetermined curvature of said central portion of said sheet shaping surface of said upper mold; and subsequently moving said outline mold and said upper mold relative to each other such that said peripheral portions of said sheets are no longer pressed between said peripheral shaping portions of said sheet shaping surface of said upper mold and sheet engaging surface of said outline mold, wherein said sheets are contacted only by sheet engaging surface of said outline mold and said peripheral shaping portions of said sheet shaping surface of said upper mold during said heating, first moving, directing and subsequent moving steps.

45. The method as in claim 44 further including the step of terminating said directing step prior to said subsequent moving step.

46. The method as in claim 44 further including the step of terminating said directing step during said subsequent moving step.

47. The method as in claim 44 wherein said peripheral portions of said sheets includes the entire peripheral portions of said sheets.

48. A method for shaping heat softenable sheet material, comprising:

supporting at least one sheet on an outline mold having a sheet engaging surface generally corresponding to a desired curvature of a peripheral portion of said sheet to be shaped;

heating said sheet to its heat softening temperature such that said sheet sags by gravity and is preliminarily shaped, wherein said peripheral portion of said sheet sags into contact with and generally conforms to said sheet engaging surface of said outline mold;

moving said outline mold and an upper mold having a sheet shaping surface which generally corresponds to a desired curvature of said sheet, relative to each other such that said peripheral portion of said sheet is pressed between said upper mold and outline mold;

directing pressurized gas from said upper mold against at least unsupported central portions of said sheet within said outline mold during at least a portion of said moving step, wherein said gas urges said unsupported portions away from said sheet shaping surface of said upper mold to shape said sheet to said desired configuration; and terminating said directing step prior to completion of said moving step and contacting said unsupported portion of said sheet with said sheet shaping surface of said upper mold; while maintaining said unsupported central portions of said sheet free from any contact along a lower major surface of said sheet during said heating, moving and directing steps.

49. A method for shaping heat softenable sheet material, comprising:

supporting at least one sheet on an outline mold having a sheet engaging surface generally corresponding to a desired curvature of a peripheral portion of said sheet to be shaped;

heating said sheet to its heat softening temperature such that said sheet sags by gravity and is preliminarily shaped, wherein said peripheral portion of said sheet sags into contact with and generally conforms to said sheet engaging surface of said outline mold;

moving said outline mold and an upper mold having a sheet shaping surface with at least selected portions which generally correspond to said desired curvature of selected areas of said peripheral portion of said sheet, relative to each other such that said selected areas of said peripheral portion of said sheet are pressed between said upper mold and outline mold;

directing pressurized gas from said upper mold against at least unsupported central portions of said sheet within said outline mold, wherein said gas urges said unsupported portions away from said sheet shaping surface of said upper mold to shape said sheet to a desired configuration; and moving said upper mold and outline mold apart and allowing said sheet to spring back to a final configuration; while maintaining said unsupported central portions of said sheet free from any contact along a lower major surface of said sheet during said heating, moving and directing steps.

* * * * *